(12) United States Patent
Tyroler

(10) Patent No.: US 7,030,752 B2
(45) Date of Patent: Apr. 18, 2006

(54) UNIVERSAL GATEWAY MODULE FOR INTERFACING A SECURITY SYSTEM CONTROL TO EXTERNAL PERIPHERAL DEVICES

(75) Inventor: Dan Tyroler, Great Neck, NY (US)

(73) Assignee: Honeywell International, Inc., Morristown, NJ (US)

( * ) Notice: Subject to any disclaimer, the term of this patent is extended or adjusted under 35 U.S.C. 154(b) by 452 days.

(21) Appl. No.: 10/364,909

(22) Filed: Feb. 11, 2003

(65) Prior Publication Data

US 2004/0123149 A1 Jun. 24, 2004

Related U.S. Application Data

(60) Provisional application No. 60/434,854, filed on Dec. 18, 2002.

(51) Int. Cl.
G08B 1/00 (2006.01)
G08B 1/08 (2006.01)

(52) U.S. Cl. .................. 340/531; 340/538; 340/539.1; 340/539.16

(58) Field of Classification Search ................ 340/531, 340/539.1, 539.16, 539.17, 539.18, 538
See application file for complete search history.

(56) References Cited

U.S. PATENT DOCUMENTS

| | | | |
|---|---|---|---|
| 4,791,658 A | 12/1988 | Simon et al. | |
| 4,872,162 A * | 10/1989 | Tanaka et al. | .............. 370/402 |
| 4,899,129 A * | 2/1990 | MacFadyen et al. | ... 340/310.01 |
| 5,081,667 A | 1/1992 | Drori et al. | |
| 5,457,730 A | 10/1995 | Rounds | |
| 5,546,071 A | 8/1996 | Zdunich | |
| 5,587,701 A | 12/1996 | Hess | |
| 5,714,933 A | 2/1998 | Le Van Suu | |
| 5,745,849 A | 4/1998 | Britton | |
| 5,777,551 A | 7/1998 | Hess | |
| 5,850,180 A | 12/1998 | Hess | |
| 6,006,088 A | 12/1999 | Couse | |
| 6,049,273 A | 4/2000 | Hess | |
| 6,104,783 A | 8/2000 | DeFino | |
| 6,134,591 A * | 10/2000 | Nickles | ....................... 709/229 |
| 6,173,169 B1 | 1/2001 | Oh | |
| 6,192,282 B1 * | 2/2001 | Smith et al. | ................... 700/19 |
| 6,373,374 B1 | 4/2002 | Siemens | |
| 6,437,692 B1 * | 8/2002 | Petite et al. | ................. 340/540 |
| 6,441,731 B1 | 8/2002 | Hess | |
| 6,501,969 B1 | 12/2002 | Cannon et al. | |
| 2001/0055954 A1 | 12/2001 | Cheng | |
| 2002/0083342 A1 * | 6/2002 | Webb et al. | ................. 713/201 |

FOREIGN PATENT DOCUMENTS

| | | |
|---|---|---|
| WO | WO 00/75900 A1 | 12/2000 |
| WO | WO 01/22701 A1 | 3/2001 |

* cited by examiner

Primary Examiner—Donnie L. Crosland
(74) Attorney, Agent, or Firm—Anthony R. Barkume, P.C.

(57) ABSTRACT

A gateway module including a security system interface for interfacing with a security system control panel via a security system bus, a peripheral device interface for interfacing with a peripheral device, and processing circuitry for controlling operation. The processing circuitry transceives security system data to and from the security system interface, wherein the security system data is configured in a security system protocol suitable for communication with a security system control panel, and transceives peripheral device data to and from the peripheral device interface, wherein the peripheral device data is configured in a peripheral device protocol suitable for communication with a peripheral device. The processing circuitry is also adapted to translate security system data to peripheral device data, and also translate peripheral device data to security system data.

39 Claims, 5 Drawing Sheets

UNIVERSAL GATEWAY MODULE FOR INTERFACING A SECURITY SYSTEM CONTROL TO EXTERNAL PERIPHERAL DEVICES

CROSS-REFERENCE TO RELATED APPLICATIONS

This application claims priority of co-pending U.S. provisional application Ser. No. 60/434,854, filed on Dec. 18, 2002; which is incorporated by reference herein.

BACKGROUND OF THE INVENTION

The present invention relates to security systems, and in particular to a universal gateway module suitable for interfacing one of many different types of peripheral devices, such as telephones or PDA's, to a security system.

There is an increasing demand for interfacing existing security systems to external peripherals and devices with functions that are not traditionally based on security system control. For example, it is desired to be able to use a telephone (corded or cordless) for various security system functions, including but not limited to entering system commands (such as arm or disarm), viewing or hearing system status, etc. Present security system control panels allow direct interfacing to some external peripherals. Most of those external peripherals communicate with the security system control panel via a propriety hardware/software communication channel specific to the design of the security system. Furthermore, each of those communication channels is associated with appropriate type of devices that can be interfaced to the control panel. The non-standard nature of the hardware/software communication channels of the control panel, along with the need to change the panel's software when introducing a new peripheral, ends up limiting the number and the choices of new external peripherals/devices that could be interfaced to existing security systems.

SUMMARY OF THE INVENTION

In order to overcome the problems of the prior art, a universal gateway module is provided, which will interface one or more of various devices not traditionally used in security system control to an existing security system. The gateway module of the present invention will allow security system control panels to interface to a wide range of new external peripheral devices that do not support the security system's non-standard communication channels. This will be achieved by the gateway's simpler and more standardized communication channel. The new gateway module will interface between the new external devices and the security system control panel in a way that it will be completely transparent to the security system control panel's hardware and software. In most cases, hardware or software changes will not be required to be made on the control panel in order to be able to interface to a variety of new external devices. There are many benefits for such a universal gateway module. With some engineering design effort on the new potential peripheral devices, and in most cases with no engineering design effort on existing security control panels, new, existing and future developed products (manufactured by many different companies) could be easily interfaced to existing control panels.

The gateway will have a sub-assembly and an enclosure. The sub-assembly will consist of a microprocessor and the appropriate interface circuitry (drivers, connectors, power supply, etc.) all which are mounted on a printed circuit board. The microprocessor (to include a built in memory to store the appropriate program and variables) will be able to transfer/control the appropriate data/signals between the control panel and an external device, accordingly. On its "front end", the gateway module will communicate with the existing communication channel of the control panel. On its "back end" the gateway module will communicate in simple and standard methods with the new external peripheral/device. The gateway could communicate with the new external device via standard "transmit"/"receive" signal/protocol using a simple/standard hardware driver circuitry. The gateway could provide additional signals to the new external device in order to accommodate more specific needs, depending on the requirement dictated by the new external device. For example, such additional signals could be telco phone lines, trigger outputs etc.

Different additional options could be provided in addition to the basic functions described above. For example, the gateway can provide power to the new peripheral/device including during AC loss (battery back-up).

In particular, the present invention is a gateway module for interfacing a peripheral device to a security system, the gateway module including a security system interface means for interfacing the gateway module with a security system control panel via a security system bus and/or other appropriate dedicated signal lines, and a peripheral device interface means for interfacing the gateway module with a peripheral device. The gateway module also has processing means for controlling operation of the gateway module. The processing means is adapted to transceive security system data to and from the security system interface means, wherein the security system data is configured in a security system protocol suitable for communication with a security system control panel, and to transceive peripheral device data to and from the peripheral device interface means, wherein the peripheral device data configured in a peripheral device protocol suitable for communication with a peripheral device. The processing means is also adapted to translate security system data received from the security interface means to peripheral device data suitable for transmission to the peripheral device interface means, and also translate peripheral device data received from the peripheral device interface means to security system data suitable for transmission to the security system device interface means.

The peripheral device may be, for example, a telephone set or a handheld computing device. The peripheral device may communicate with the gateway module via a tethered connection such as a UART, USB or Ethernet LAN connection, or communications may be wireless, for example via the IEEE 802.11 standard or the BLUETOOTH standard.

DETAILED DESCRIPTION OF THE PREFERRED EMBODIMENT

Figure 1:
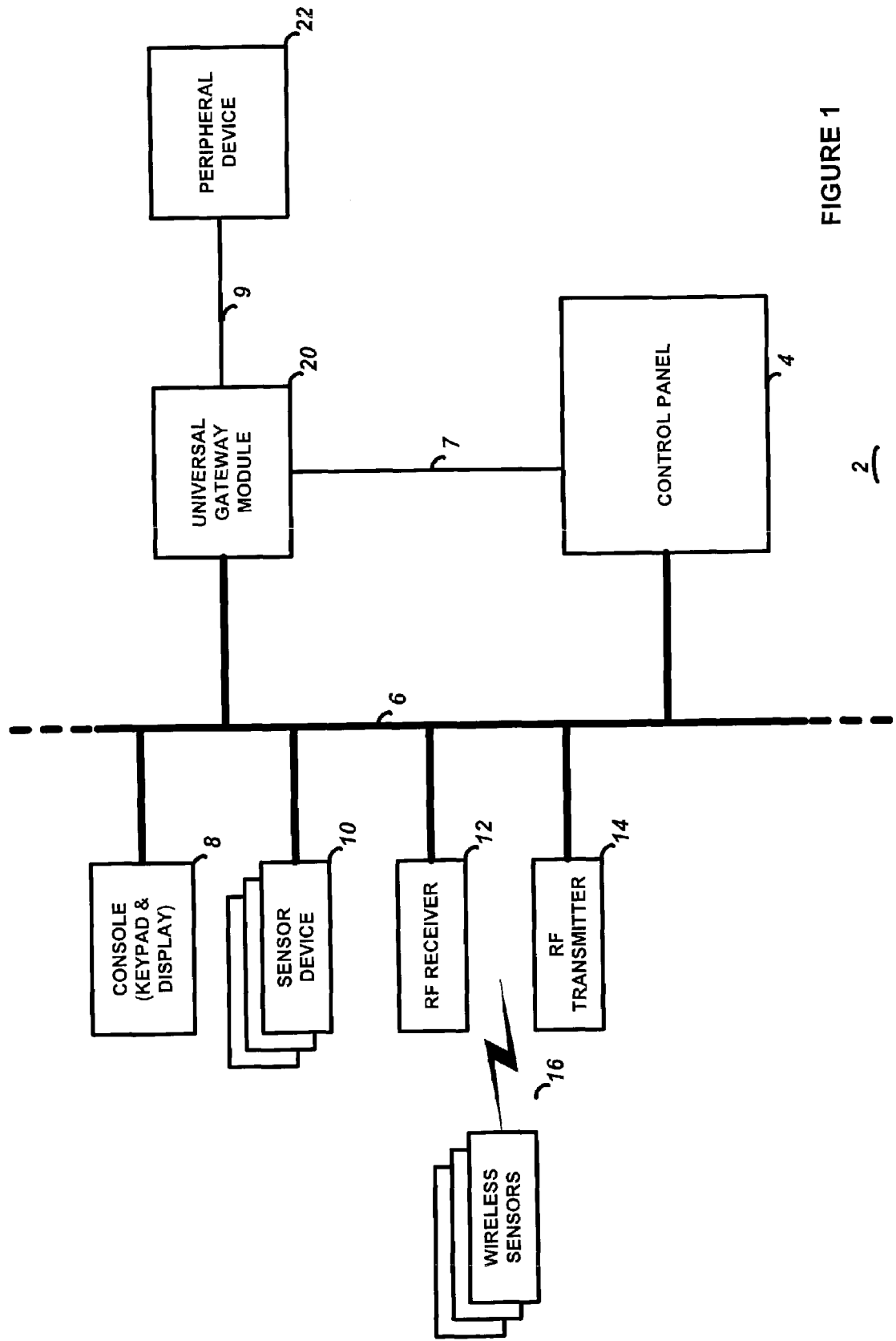
FIG. 1 is a block diagram of the security system configured with the universal gateway module of the present invention.

FIG. 1 is a block diagram of the gateway module of the present invention implemented to interface a peripheral device with a typical security system. Thus, FIG. 1 illustrates a security system 2 that includes a control panel 4, a console keypad and display 8, a plurality of sensor/expander devices 10, an RF receiver 12, and an RF transmitter 14, all of which communicate via a wired system bus 6. The sensor/expander devices 10 detect changes in the surrounding environment by using devices that are well known in the art, such as passive infrared motion detectors, glass break detectors, magnetic reed switches, and the like. The RF receiver and transmitter communicate with one or more wireless devices 16 that may monitor the environment as described above. The control panel is configured to monitor the status of the sensor devices and indicate an alarm condition under predetermined conditions, and may dial a central alarm station and/or sound a local siren to indicate an alarm condition. All of these devices and their operation are well known in the art of security systems and need not be described further.

Figure 2:
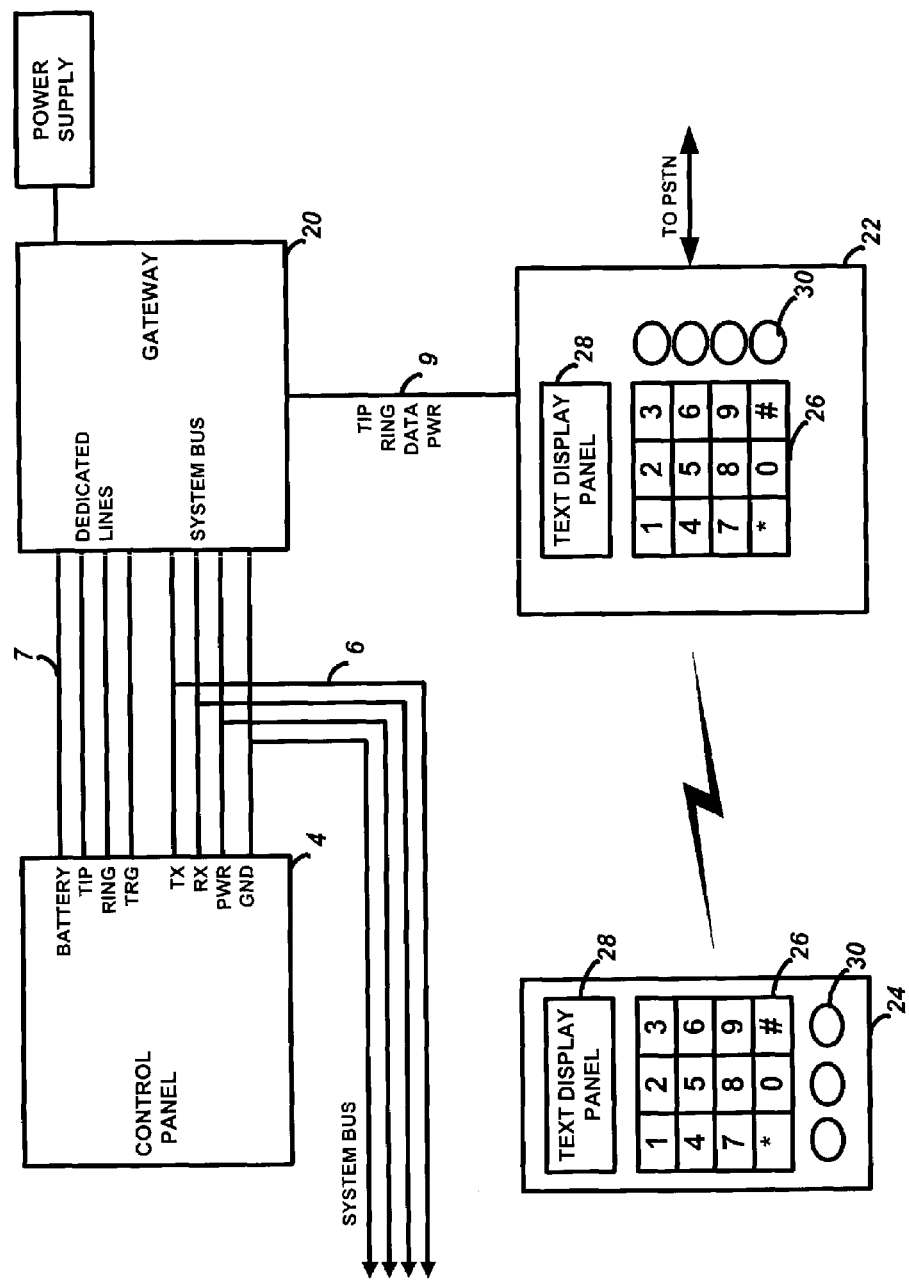
FIG. 2 is an additional block diagram of the present invention with a telephone used as a peripheral device.

FIGS. 1 and 2 also illustrate a universal gateway module 20 (referred to herein as a gateway), which is connected as an interface between the control panel 4 and a peripheral control device 22 (referred to herein as a peripheral) via security system bus 6 and (if required) dedicated connections 7. That is, in addition to interfacing the peripheral to the system bus for communicating with the control panel, the system design may also provide for one or more directly wired connections between the peripheral and the control panel, in order to perform data transfers or control in a manner not provided by the system bus. As previously described, the peripheral is a device such as a telephone, PDA, and the like, that is traditionally not used for security system control but which is able to provide security system control and status via the gateway under this invention.

One example of a peripheral that can be adapted, via the gateway, to control a security system and provide status to a user is a telephone. A telephone lends itself to user interface tasks since it has a keypad 26 for data entry, a series of dedicated buttons 30 that can be configured for dedicated security system functions as well as telephony functions (e.g. right/left arrows, the redial button), and, in most cases, a display 28. The display is typically used in modern telephones for caller-ID functions, and can thus be used to display security system status to a user when used in conjunction with the gateway 20. In addition, a telephone has a handset 24 with audio input/output functions, and/or a speaker/microphone combination for hands free conversations. These audio devices also lend themselves to use with a security system, for example to announce system status or allow voice input for control.

In addition, since many telephones being sold today are cordless, and have keys, display, and audio devices on the remote handset 24, use of such cordless phones allows a user to carry a security system remote control around the protected premises without being tethered to a base station. Furthermore, by interfacing a telephone with the security system via the gateway 20, remote operation is made feasible since a user could call into his home phone from another phone (e.g. when on vacation) and easily interface with the security system via the peripheral 22 and the gateway 20.

Figure 3:
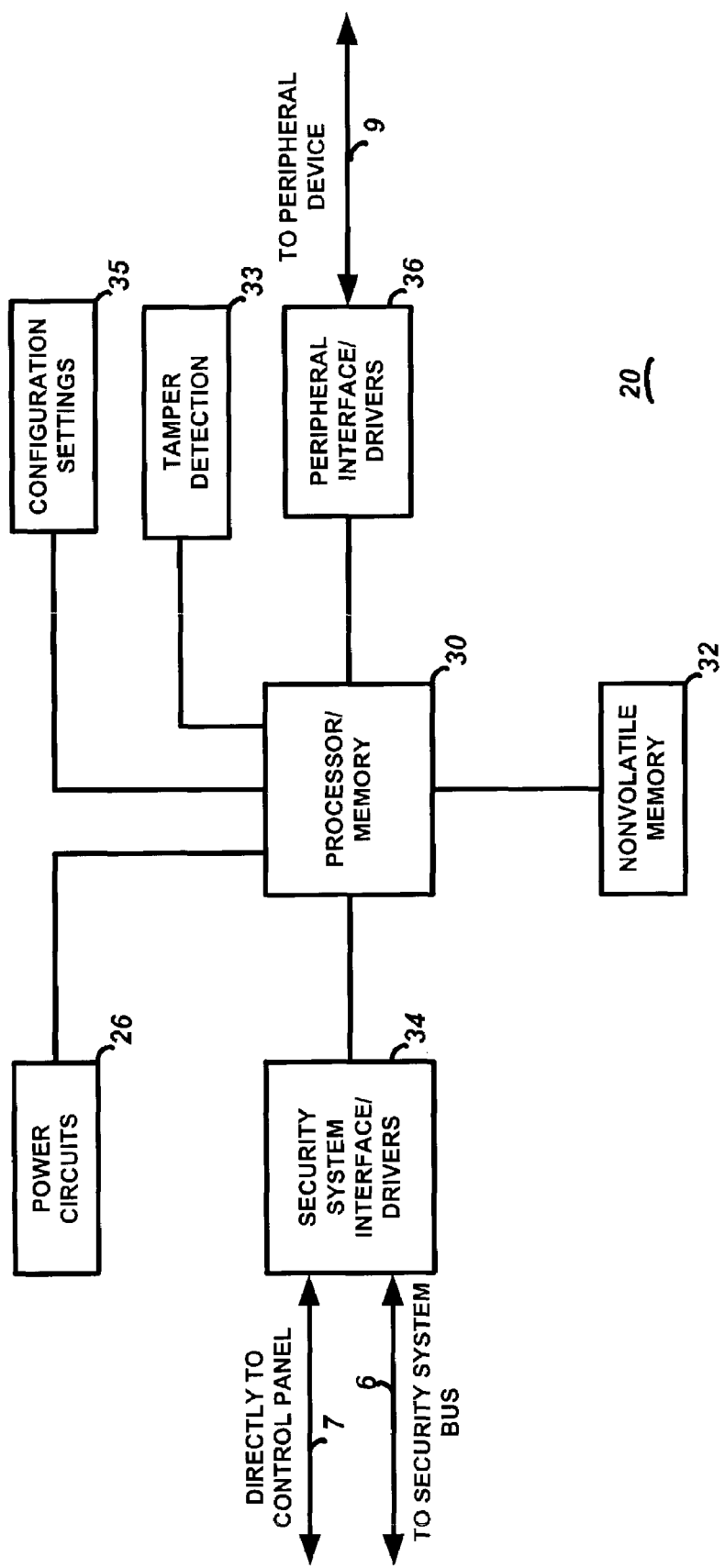
FIG. 3 is a block diagram of the gateway module.

The gateway 20 is shown in block diagram in FIG. 3. The gateway has a microprocessor 30 and associated memory components 32, security system interface circuitry 34 for interfacing with the security system control panel (via system bus connection 6 and direct wired connections 7), and interface circuitry 36 for interfacing with the peripheral 22. The gateway functions essentially as a data translator and converter, taking data and signals from the system bus 6 and direct connections 7 and translating/converting them via a predetermined translation scheme to a protocol/signals suitable for interfacing with the peripheral device 22. In one example, the gateway appears to the control panel 4 as a security system console, comprising a keypad and display. When the control panel wants to send data to the gateway, it issues appropriate commands onto the bus 6 intended for the gateway 20. Likewise, when a user enters data and/or commands into the keypad 26 of the peripheral 22, the entered data is translated by the gateway 20 to the system protocol understood by the control panel 4 and sent on the system bus 6. The control panel interprets the data as coming from a keypad since the gateway/peripheral combination emulates a security system keypad to the control panel.

I the case of a telephone peripheral device 22, dedicated connections that are wired between the gateway 20 and the control panel 4 would include standard telephone connections such as the tip and ring connections, which are provided by the connections 9 between the telephone peripheral 22 and the gateway 20 as shown in FIG. 2. The gateway, operating on command from the control panel, could then control operation of the telephone peripheral 22 by sending appropriate signals to the gateway, which are passed on to the telephone peripheral 22 as shown in the figures.

Power may also be provided to the gateway by a dedicated "battery" line or an optional power supply, both of which are shown in FIG. 2. Optionally, the gateway could provide backup power to the peripheral device 22 in the event of primary power loss. Tamper detection circuits 33 may also be used and connected directly to the control panel via direct connections 7.

As an example of the operation of the present invention, a user may want to arm the security system via the telephone peripheral. A dedicated button may be provided on the telephone panel that switches the telephone into a security system interface mode, whereby subsequent keypresses are directed to the gateway 20 rather than dialing a call on the PSTN. In the alternative to a dedicated button, a user code may be entered, such as a unique numerical sequence (e.g. "#45456#"), which is interpreted by the processor inside the telephone as a security system control code. Subsequent data entries are then directed to the gateway for controlling the control panel. For example, the user might press a key sequence to indicate that the system should be armed (this may also be accomplished with the press of a dedicated button, such as the redial button). Another alternative embodiment is the use of a menu displayed (or enunciated) at the peripheral device such that keys or buttons would be used to navigate through the menu and select the desired command, function, etc. In the case of a telephone peripheral, a user might press a number key corresponding to a desired menu selection, or use up/down arrows, etc. An example for a menu selection could be the user selecting from the menu (or press a key sequence) for a system status request. The status request, which would be transmitted by the telephone to the gateway in a simple, predefined serial protocol, would then be translated by the gateway into the system protocol understood by the control panel. The control panel would receive the system status request and respond with a system status message, which would be received by the gateway and then translated into the serial protocol understood by the peripheral telephone device. The status message would then be displayed on the telephone display, or it could be enunciated via the telephone handset (including a cordless handset) or speaker (e.g. on a base unit).

For example, assume that the control panel receives an alarm message from one of the sensors and determines that an alarm condition exists. The gateway may detect the alarm condition from the security system bus and transfer appropriate information to the telephone peripheral by using a predetermined protocol scheme between the gateway and the telephone peripheral. The telephone peripheral will then display and/or annunciate the alarm condition accordingly on its display and/or speaker.

By using a telephone as a peripheral device in conjunction with the gateway, off-premises access via the telephone network is easily enabled. Thus, a user would dial his home phone number, and once the phone picks up (i.e. is recording the call on an internal answering machine), then the user would press a predetermined PIN to access the security system control features. The user on the remote phone would then control operation of the security system in the same manner as if he were using the on-site peripheral telephone device directly.

The telephone may also be used as a two way voice device. For example, an alarm condition may be detected by the control panel, and the control panel then sends an alarm report to a central station monitoring service as known in the art. The monitoring service company can stay on line and listen on what is happening at the premises. Available options are talk/listen/speakerphone mode. The gateway will instruct the phone when to go into above-mentioned two way session. Obviously this feature will take advantage of the standard features available on the phone (listen/talk/speakerphone). It is noted that the phone line connection to the central station is established by the control panel as known in the art, and (only when instructed) the peripheral telephone will go online to establish the two way voice, as per DTMF commands coming from the monitoring device.

Figure 4:
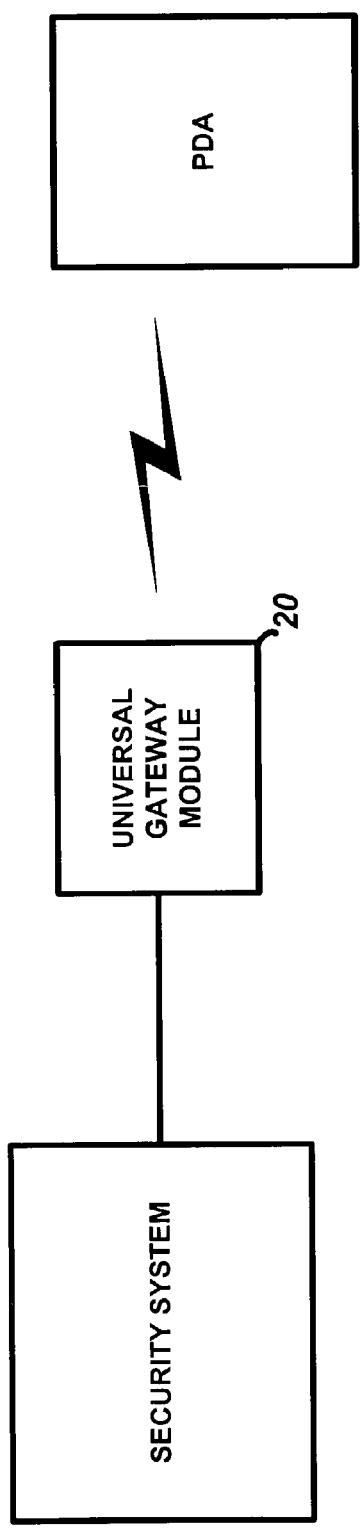
FIG. 4 is an illustration of the gateway utilized with a wireless PDA.
Figure 5:
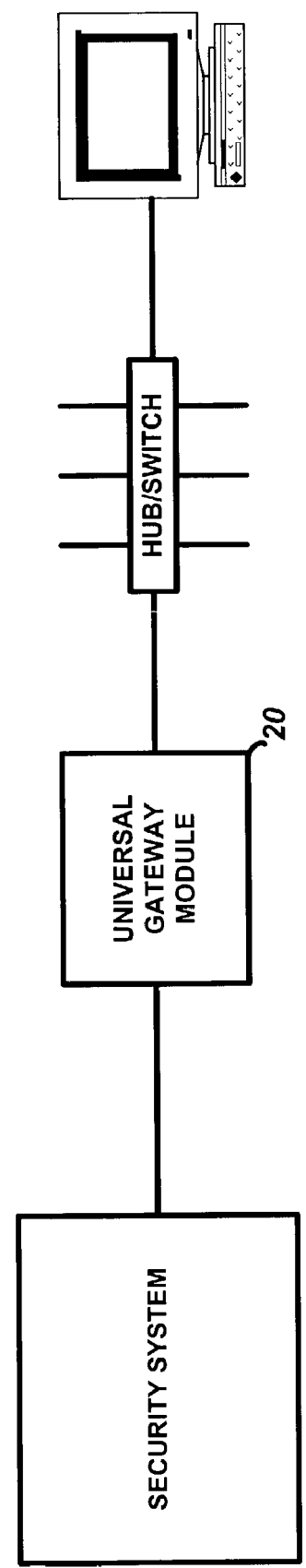
FIG. 5 is an illustration of the gateway utilized with a local area network.

Other devices may be used as peripherals by conforming them to interface with the gateway module 20. By adapting the appropriate peripheral interface/drivers 36, the gateway could be modified to communicate with any desired type of peripheral. For example, as shown in FIG. 4, a personal digital assistant (PDA), configured with wireless communications such as BLUETOOTH, IEEE 802.11 (Wi-Fi), or other type of protocol may be adapted to the present invention. If a PDA implements a wireless connection, then the gateway 20 would also be configured with the same wireless standard. As shown in FIG. 5, the gateway could be part of a local area network (LAN) by configuring it, for example, with an Ethernet connector (RJ45) and interface circuitry, and connecting it to a LAN via a hub or the like. This allows any device on the LAN (such as a desktop PC, a laptop PC, a tablet PC with a touchscreen display, a PDA, etc.) to communicate with the control panel under this invention The LAN may be wired, wireless (such as with the aforementioned 802.11 devices) or a combination of both, as well known in the art. Moreover, BLUETOOTH adaptability would be especially advantageous since cell phones are becoming equipped with BLUETOOTH as factory options, thus enabling easy compatibility with the gateway. Application software would be available with the peripheral to enable communications under this invention.

Figure 6:
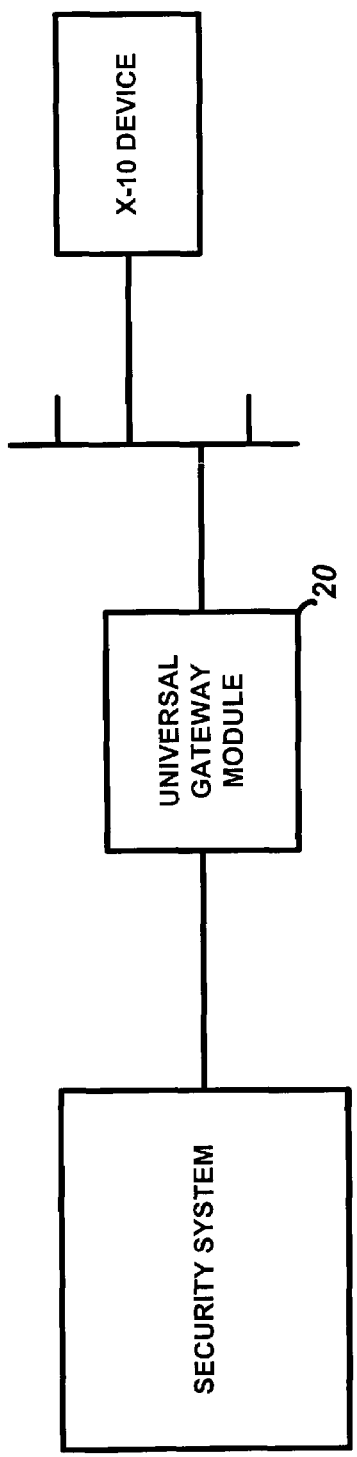
FIG. 6 is an illustration of the gateway utilized with an X-10 network.

Other applications and features that can be implemented with the gateway of the present invention are described as follows. The gateway can be used for controlling external appliances, relays, lights, video sources, dialer, X-10 and other devices by taking advantage of the security control built in features such as scheduling, authority levels etc. FIG. 6 illustrates the gateway connected to an X-10 device via an X-10 bus (which is simply the power lines of the premises as well known in the art).

The gateway may also be used for interfacing to a caller ID in order to filter out users/authorities and execute the appropriate functions (filter calls). The gateway may interface access control peripherals (e.g. a card reader) and different remote controlling/gathering data devices (finger detection, touch screens) in order to control accordingly the security system.

Figure 7:
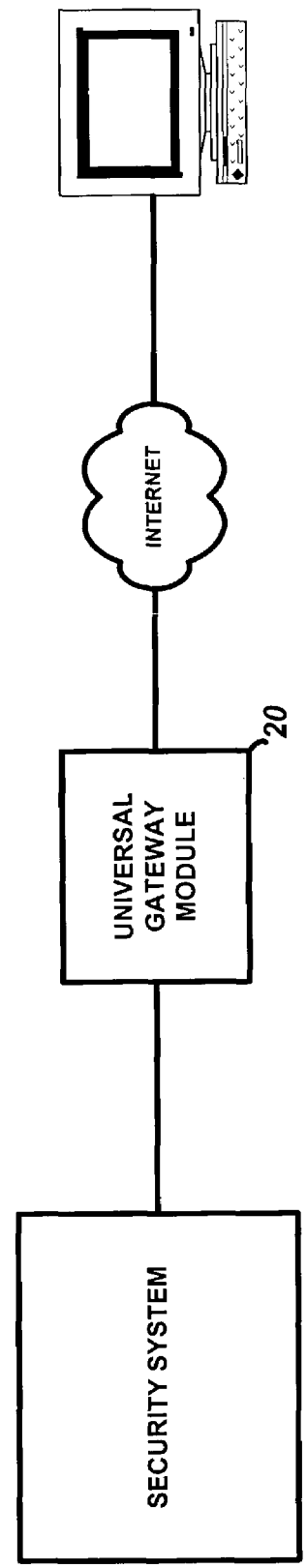
FIG. 7 is an illustration of the gateway utilized with a wide area network such as the Internet.

As shown in FIG. 7, the gateway may interface to a wide area network such as the Internet in order to control the security system and retrieve data from the security system, including video outputting/streaming to the network (LAN or WAN).

The gateway may interface to an audio equipment to announce status/event occurring on the security control.

The gateway may also interface to senior care and other monitoring devices (in order for the security control to dial to the appropriate agencies at the appropriate time/event occurrence).

What is claimed is:

1. A gateway module for interfacing a peripheral device to a security system comprising:
   a. security system interface means for interfacing the gateway module with a security system control panel;
   b. peripheral device interface means for interfacing the gateway module with a peripheral device; and
   c. processing means for controlling operation of the gateway module, the processing means adapted to:
      i. transceive security system data to and from the security system interface means, the security system data configured in a security system protocol suitable for communication with a security system control panel;
      ii. transceive peripheral device data to and from the peripheral device interface means, the peripheral device data configured in a peripheral device protocol suitable for communication with a peripheral device;
      iii. translate security system data received from the security interface means to peripheral device data suitable for transmission to the peripheral device interface means; and
      iv. translate peripheral device data received from the peripheral device interface means to security system data suitable for transmission to the security system device interface means.

2. The gateway module of claim 1 wherein the security system interface means is adapted to interface the gateway module to a security system control panel via a security system data bus.

3. The gateway module of claim 1 wherein the security system interface means is adapted to interface the gateway module directly to a security system control panel via directly wired connections.

4. The gateway module of claim 1 wherein the peripheral device interface means is configured to interface the gateway module with a telephone set.

5. The gateway module of claim 1 wherein the peripheral device interface means is configured to interface the gateway module with a handheld computing device.

6. The gateway module of claim 1 wherein the peripheral device interface means comprises a wireless communications module for enabling wireless communications with a peripheral device.

7. The gateway module of claim 6 wherein the wireless communications module is adapted to communicate under the IEEE 802.11 standard.

8. The gateway module of claim 6 wherein the wireless communications module is adapted to communicate under the BLUETOOTH standard.

9. The gateway module of claim 1 wherein the peripheral device interface means comprises a Universal Serial Bus (USB) connector.

10. The gateway module of claim 1 wherein the peripheral device interface means comprises means for communicating under the X-10 protocol.

11. The gateway module of claim 1 wherein the peripheral device interface means is adapted to control lighting devices connected thereto.

12. The gateway module of claim 1 wherein the peripheral device interface means comprises a local area network (LAN) adapter for communicating with a computing device connected to a LAN.

13. The gateway module of claim 1 wherein the peripheral device interface means is adapted to interface with an external access control device.

14. A security system comprising:
   A. a control panel for controlling operation of the security system;
   B. a plurality of alarm sensors interconnected to the control panel;
   C. a security system bus for interconnecting the control panel with the plurality of alarm sensors; and
   D. a security system control apparatus comprising a gateway module interconnected to the control panel, and a peripheral device connected to the gateway module, wherein the gateway module comprises:
      a. security system interface means for interfacing the gateway module with the control panel;
      b. peripheral device interface means for interfacing the gateway module with the peripheral device; and
      c. processing means for controlling operation of the gateway module, the processing means adapted to:
         i. transceive security system data to and from the security system interface means, the security system data configured in a security system protocol suitable for communication with the control panel;
         ii. transceive peripheral device data to and from the peripheral device interface means, the peripheral device data configured in a peripheral device protocol suitable for communication with the peripheral device;
         iii. translate security system data received from the security interface means to peripheral device data suitable for transmission to the peripheral device interface means; and
         iv. translate peripheral device data received from the peripheral device interface means to security system data suitable for transmission to the security system device interface means.

15. The security system of claim 14 wherein the security system interface means is adapted to interface the gateway module to the control panel via the security system bus.

16. The security system of claim 14 wherein the security system interface means is adapted to interface the gateway module directly to the control panel via directly wired connections.

17. The security system of claim 14 wherein the peripheral device is a telephone set, and wherein the peripheral device interface means is configured to interface the gateway module with the telephone set.

18. The security system of claim 14 wherein the peripheral device is a handheld computing device, and wherein the peripheral device interface means is configured to interface the gateway module with the handheld computing device.

19. The security system of claim 14 wherein the peripheral device is a wireless device, and wherein the peripheral device interface means comprises a wireless communications module for enabling wireless communications with the wireless device.

20. The security system of claim 19 wherein the wireless communications module is adapted to communicate under the IEEE 802.11 standard.

21. The security system of claim 19 wherein the wireless communications module is adapted to communicate under the BLUETOOTH standard.

22. The security system of claim 14 wherein the peripheral device interface means comprises a Universal Serial Bus (USB) connector.

23. The security system of claim 14 wherein the peripheral device interface means comprises means for communicating under the X-10 protocol.

24. The security system of claim 14 wherein the peripheral device interface means is adapted to control lighting devices connected thereto.

25. The security system of claim 14 wherein the peripheral device interface means comprises a local area network (LAN) adapter for communicating with a computing device connected to a LAN.

26. The security system of claim 14 wherein the peripheral device interface means is adapted to interface with an external access control device.

27. The security system of claim 14 wherein the peripheral device interface means is adapted to interface with an external audio device.

28. The security system of claim 14 wherein the peripheral device interface means is adapted to interface with an external audio device.

29. A method for controlling a security system with a peripheral device comprising the steps of:
   a. receiving, with a gateway module interconnected to the peripheral device, a first set of peripheral device data from the peripheral device,
   b. translating the first set of peripheral device data received from the peripheral device to a first set of security system data suitable for transmission to a security system control panel;
   c. communicating with the security system control panel by
      i. transmitting the first set of security system data to the security system control panel, and
      ii. receiving, with the gateway module, a second set of security system data from the security system control panel,
   d. translating the second set of security system data received from the security system control panel to a second set of peripheral device data suitable for transmission to the peripheral device; and
   e. transmitting the second set of peripheral device data to the peripheral device.

30. The method of claim 29 wherein the gateway module communicates with the security system control panel via a security system data bus.

31. The method of claim 29 wherein the gateway module communicates directly with the security system control panel via directly wired connections.

32. The method of claim 29 wherein the peripheral device is a telephone set.

33. The method of claim 29 wherein the peripheral device is a handheld computing device.

34. The method of claim 29 wherein the peripheral device is a wireless device.

35. The method of claim 34 wherein the wireless device is adapted to communicate under the IEEE 802.11 standard.

36. The method of claim 34 wherein the wireless device is adapted to communicate under the BLUETOOTH standard.

37. The method of claim 24 wherein the peripheral device communicates with the gateway module using the Universal Serial Bus (USB) protocol.

38. The method of claim 24 wherein the peripheral device communicates with the gateway module using the X-10 protocol.

39. The method of claim 24 wherein the peripheral device communicates with the gateway module using a local area network (LAN).

* * * * *